United States Patent
No et al.

(10) Patent No.: US 12,316,738 B2
(45) Date of Patent: May 27, 2025

(54) ELECTRONIC DEVICE FOR DELEGATING GENERATION OF HOMOMORPHIC ROTATION KEY TO SERVER AND METHOD OF OPERATING THE SAME

(71) Applicants: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

(72) Inventors: Jong Seon No, Seoul (KR); Joon Woo Lee, Seoul (KR); Young Sik Kim, Gwangju (KR)

(73) Assignees: SEOUL NATIONAL UNIVERSITY R&DB FOUNDATION (KR); INDUSTRY-ACADEMIC COOPERATION FOUNDATION, CHOSUN UNIVERSITY (KR)

( * ) Notice: Subject to any disclaimer, the term of this patent is extended or adjusted under 35 U.S.C. 154(b) by 247 days.

(21) Appl. No.: 18/105,117

(22) Filed: Feb. 2, 2023

(65) Prior Publication Data
US 2023/0254112 A1 Aug. 10, 2023

(30) Foreign Application Priority Data
Feb. 10, 2022 (KR) .......... 10-2022-0017596
Aug. 17, 2022 (KR) .......... 10-2022-0102557

(51) Int. Cl.
H04L 29/06 (2006.01)
H04L 9/00 (2022.01)
(Continued)

(52) U.S. Cl.
CPC ............ *H04L 9/008* (2013.01); *H04L 9/0637* (2013.01); *H04L 9/14* (2013.01)

(58) Field of Classification Search
None
See application file for complete search history.

(56) References Cited

U.S. PATENT DOCUMENTS

2018/0375640 A1* 12/2018 Laine .................. H04L 9/008
2022/0014351 A1* 1/2022 Jung .................. H04L 9/008

FOREIGN PATENT DOCUMENTS

| CN | 116340962 A | * | 6/2023 | |
| EP | 3660765 A1 | | 6/2020 | |
| GB | 2541040 A | * | 2/2017 | ... G06F 16/256 |

OTHER PUBLICATIONS

European Search Report for EP Application No. 23151723.3, dated Jul. 4, 2023, 12 pages.
(Continued)

*Primary Examiner* — Andrew J Steinle
(74) *Attorney, Agent, or Firm* — Dickinson Wright PLLC (57) ABSTRACT

In a client-server model for generating a rotation operation key in fully homomorphic encryption, a client transmits a public key and a hierarchical Galois key generated using a secret key to a server, and the server performs a rotation operation on the public key using the hierarchical Galois key to directly generate one or more rotation operation keys, so that the server may generate a rotation operation key if necessary while computational burden and communication cost of the client are reduced.

16 Claims, 4 Drawing Sheets

(51) Int. Cl.
    *H04L 9/06*     (2006.01)
    *H04L 9/14*     (2006.01)

(56) References Cited

OTHER PUBLICATIONS

Li et al., et al., "Multi-user Fully Homomorphic Encryption Scheme based on Policy for Cloud Computing," 16th European Conference—Computer Vision—ECCV 2020, Sep. 17, 2021, pp. 274-286.

Park, "Homomorphic Encryption for Multiple Users With Less Communications," IEEE Access, Oct. 2021, Belgium, pp. 135915-135926, vol. 9.

Zhu et al., "Practical MPC+FHE with Applications in Secure Multi-Party Neural Network Evaluation," Crytology ePrint Archive, Paper 2020/550, Jun. 2020, pp. 1-15.

Duan et al., "A Comprehensive Security Framework for Publish/Subscribe-Based IoT Services Communication," IEEE Access, Mar. 2019, pp. 25989-26001, vol. 7.

Han et al., "Better Bootstrapping for Approximate Homomorphic Encryption," Crytology ePrint Archive, Paper 2019/668, 2019, pp. 1-26.

Lee et al., "Authorization of Evaluation Key Generation for Homomorphic Encryption," pp. 1-6.

Lee et al., "Hierarchical Galois Key Management Systems for Privacy Preserving AIaaS with Homomorphic Encryption," Conference, 2022, pp. 1-20.

\* cited by examiner

ELECTRONIC DEVICE FOR DELEGATING GENERATION OF HOMOMORPHIC ROTATION KEY TO SERVER AND METHOD OF OPERATING THE SAME

CROSS-REFERENCE TO RELATED APPLICATION

Pursuant to 35 U.S.C. § 119, this application claims the benefit of earlier filing date and right of priority to Korean Application No. 10-2022-0017596, filed on Feb. 10, 2022 and Korean Application No. 10-2022-0102557, filed on Aug. 17, 2022, the contents of which are all hereby incorporated by reference herein in their entirety.

BACKGROUND OF THE INVENTION

Field of the Invention

The present invention relates to homomorphic encryption technology, and more particularly to a method of generating a homomorphic rotation key for performing a rotation operation in homomorphic encryption.

Description of the Related Art

Homomorphic Encryption (HE) is an encryption method that may calculate data in an encrypted state. A result of an operation using ciphertexts becomes a new ciphertext, and a plaintext obtained by decrypting the ciphertext is the same as an operation result of original data before encryption. Homomorphic encryption may be used to store personal information in an external medium or to calculate the personal information while safely protecting the personal information. For example, when homomorphic encryption is used, data may be outsourced to a commercial cloud service in an encrypted state and processed in the encrypted state.

In homomorphic encryption, several pieces of data are encrypted into one ciphertext, and when two different ciphertexts are operated, the operation is performed between pieces of data at corresponding locations. When data at a different location within the ciphertext needs to be operated on in an encrypted state, the location needs to be shifted in some cases so that the operation can be performed. Only a homomorphic rotation operation, which is a circular shift operation in an encrypted state, is an operation for changing a location of data in a ciphertext in an encrypted state, and the homomorphic rotation operation corresponds to an essential operation in using homomorphic encryption.

Figure 1:
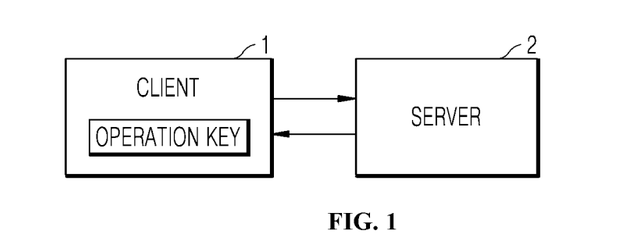
FIG. 1 is a network environment of a conventional client-server model for performing a homomorphic encryption operation.

FIG. 1 is a network environment of a conventional client-server model for performing a homomorphic encryption operation. Referring to FIG. 1, in the conventional client 1-server 2 model for performing the homomorphic encryption operation, the client 1 generating a ciphertext according to homomorphic encryption may generate and transmit a necessary operation key in order to request that the server 2 perform the homomorphic encryption operation on the ciphertext. For example, the client 1 may generate a rotation operation key for performing rotation operation according to homomorphic encryption using a secret key thereof and transmit the generated rotation operation key to the server 2, thereby performing rotation operation on the ciphertext in the server 2. The operation key required for homomorphic encryption may be generated from the secret key of the client 1, and thus cannot be generated in another electronic device that does not know the secret key, for example, the server 2.

SUMMARY OF THE INVENTION

Homomorphic rotation keys for performing rotation operations in homomorphic encryption occupy several hundred MB in many cases, and there are a variety of more than 100 types. Therefore, considerable costs are incurred when all rotation operation keys are generated in a client device and transmitted to a server.

Therefore, the present invention has been made in view of the above problems, and it is an object of the present invention to provide a client-server model in which a client delegates a right to generate some operation keys for a homomorphic encryption operation to a server by newly proposing a method of generating an operation key for the homomorphic encryption operation using a public key rather than a secret key of the client.

It is another object of the present invention to provide a server configured to directly generate a necessary operation key using a public key of a client while performing a homomorphic encryption operation by being delegated a generation right for some operation keys from a client, thereby performing a homomorphic encryption operation on a ciphertext of the client.

In accordance with an aspect of the present invention, the above and other objects can be accomplished by the provision of an electronic device including a communication interface configured to support communication using a security protocol, a memory including personal information data, and at least one processor operatively coupled to the communication interface and the memory, in which the at least one processor generates a ciphertext obtained by encrypting the personal information data according to homomorphic encryption and generates a public key and one or more operation keys by using a secret key for the electronic device, transmits the ciphertext, the public key, and the one or more operation keys to a server through the communication interface, and receives service information acquired based on a homomorphic encryption operation on the ciphertext from the server, and the one or more operation keys correspond to some of all operation keys necessary for the homomorphic encryption operation.

The one or more operation keys may include a hierarchical Galois key for a homomorphic encryption rotation operation, and the hierarchical Galois key may generate a plurality of rotation operation keys for the homomorphic encryption rotation operation.

The plurality of rotation operation keys may be generated by repeatedly performing a rotation operation on the public key using the hierarchical Galois key.

The at least one processor may generate the hierarchical Galois key in response to a k-step shift, and the plurality of rotation operation keys may be generated in response to a multiple of the k-step shift.

A master key corresponding to the k-step shift may be generated in response to receiving a request for the k-step shift for a homomorphic encryption operation from the server.

The one or more operation keys may include a multiplication key, a conjugate complex key, and one or more hierarchical Galois keys.

The at least one processor may generate the one or more hierarchical Galois keys in response to different step shifts.

The personal information data may include at least one of user biometric data, a photo, a moving image, and log data collected by the electronic device.

The server may acquire the service information according to a result of performing a homomorphic encryption operation on the ciphertext to provide a neural network service, AI as a service, or a search service.

In accordance with another aspect of the present invention, there is provided a server including a communication interface configured to support communication using a security protocol, and at least one processor operatively coupled to the communication interface, in which the communication interface receives a ciphertext, a public key, and a hierarchical Galois key from an electronic device, the at least one processor generates a rotation operation kay using the public key and the hierarchical Galois key in response to a data shift request for a homomorphic encryption operation on the ciphertext, and the at least one processor performs a rotation operation on the ciphertext using the rotation operation key.

The at least one processor may generate the rotation operation key by performing a rotation operation on the public key using the hierarchical Galois key.

The at least one processor may generate a rotation operation key corresponding to a k-step shift using the hierarchical Galois key.

The at least one processor may generate a plurality of rotation operation keys corresponding to multiples of the k-step shift by repeatedly performing a rotation operation on the public key using the hierarchical Galois key.

The at least one processor may request a hierarchical Galois key for generating a rotation operation key corresponding to the k-step shift from the electronic device before receiving the hierarchical Galois key.

The at least one processor may acquire service information according to a result of performing a homomorphic encryption operation on the ciphertext, and transmit the service information to the electronic device to provide a neural network service, AI as a service, or a search service.

The server may further include a memory, in which the rotation operation key may be stored in the memory, and the at least one processor may perform a rotation operation using the rotation operation key stored in the memory in response to a re-request for a k-step shift for the ciphertext.

The at least one processor may delete the rotation operation key stored in the memory.

In accordance with a further aspect of the present invention, there is provided a non-transitory computer-readable storage medium storing one or more programs configured to be executed by a server system, the one or more programs including an instruction causing the server system to receive a ciphertext, a public key, and one or more operation keys from an electronic device, generate, by a processor, a rotation operation key using the public key and the one or more operation keys in response to a request for a homomorphic rotation operation on the ciphertext, and performing, by the processor, a rotation operation on the ciphertext using the rotation operation key.

The rotation operation key may be generated by performing, by the processor, a rotation operation on the public key using a hierarchical Galois key.

A plurality of rotation operation keys may be generated by repeatedly performing, by the processor, a rotation operation on the public key using the hierarchical Galois key.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments will be described in detail with reference to the accompanying drawings. However, the scope of rights is not limited or restricted by these embodiments. Like reference numerals in each figure indicate like elements.

General and universal terms in the related technical field have been selected as terms used in the description below. However, there may be other terms depending on the development and/or change of technology, preference of conventional technicians, etc. Therefore, the terms used in the description below should not be construed as limiting the technical idea, and should be understood as exemplary terms for describing the embodiments.

Further, in specific cases, there are terms arbitrarily selected by the applicant, and in this case, the meaning will be described in detail in the corresponding description. Therefore, the terms used in the description below should be understood based on meanings of the terms and content throughout the specification rather than simple names of the terms.

Figure 2:
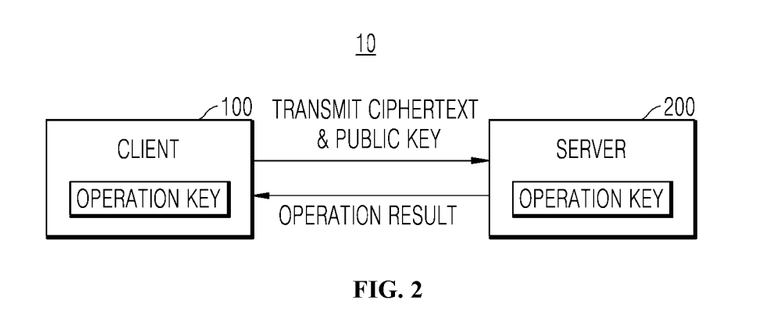
FIG. 2 is a network environment of a client-server model in which a right to generate some operation keys is delegated to a server according to an embodiment.

FIG. 2 is a network environment of a client 100-server 200 model 10 in which a right to generate some operation keys is delegated to the server 200 according to an embodiment.

The client 100 may include data on which a homomorphic encryption operation is to be performed, and the server 200 may perform the homomorphic encryption operation on the data of the client 100. The client 100 may encrypt the data according to homomorphic encryption and transmit the encrypted data to the server 200 in order to request the homomorphic encryption operation from the server. The client 100 may generate only some of all operation keys necessary for the homomorphic encryption operation and transmit the operation keys to the server 200, and may delegate a right to generate the remaining operation keys to the server 200. In an embodiment, the client 100 may delegate a right to generate some operation keys by transmitting one or more operation keys capable of generating other operation keys together with a ciphertext. The one or more operation keys are a type of public key, and the client 100 may transmit a public key, some operation keys (for example, a multiplication key, a conjugate complex key (conjugation), etc.), an operation key (for example, a hierarchical Galois key) for generating other operation keys (for example, a rotation operation key) as the one or more operation keys. For example, the client 100 may transmit the multiplication key and the conjugate complex key to the server 200 as some operation keys, and may transmit a hierarchical Galois key to the server 200 as the operation key for generating other operation keys.

The client 100 may generate a public key and one or more operation keys using a secret key thereof. In various embodiments of the present disclosure, the client 100 may not generate all operation keys necessary for a homomorphic encryption operation and transmit the operation keys to the server 200. In particular, referring to a plurality of rotation operation keys necessary for a homomorphic encryption rotation operation, in order to directly generate and use necessary rotation operation keys at a necessary time in the server 200, the client 100 may generate only the hierarchical Galois key and transmit the hierarchical Galois key to the server 200, thereby delegating a right to generate rotation operation keys to the server 200.

The hierarchical Galois key is a type of public key that can generate an operation key (evaluation key) for a rotation operation of a homomorphic ciphertext. The hierarchical Galois key may include one or more Galois keys. The hierarchical Galois key including one or more Galois keys may be referred to as a hierarchical Galois key or a hierarchical Galois key set for convenience of description. For example, the hierarchical Galois key may include a Galois key corresponding to a k-step shift. Since the hierarchical Galois key is a type of public key, another electronic device (for example, the server) receiving the hierarchical Galois key may generate an operation key for a rotation operation using the hierarchical Galois key.

In various embodiments, the server 200 may generate a plurality of rotation operation keys capable of performing step shift corresponding to a multiple of k by using the Galois key corresponding to a k-step shift. As an example, when the hierarchical Galois key is a Galois key corresponding to k=1, the Galois key corresponding to k=1 may be used 13 times to generate a rotation operation key for a 13-step shift. As another example, when a hierarchical Galois key set includes Galois keys corresponding to k={1, −1, 2, −2, 4, −4, 8, −8}, a Galois key corresponding to k=8, a Galois key corresponding to k=4, and a Galois key corresponding to k=1 may be sequentially used to generate a rotation operation key for a 13-step shift.

In various embodiments, the client 100 may generate a hierarchical Galois key set including one or more Galois keys and transmit the hierarchical Galois key to the server 200. Alternatively, the server 200 may first request a necessary hierarchical Galois key set from the client 100.

The server 200 may directly generate an operation key necessary for the homomorphic encryption operation by using an operation key (public key) that generates another operation key without a secret key of the client 100.

The server 200 may provide the client 100 with service information based on an operation result of performing a homomorphic encryption operation on encrypted data. The server 200 may perform a homomorphic operation on a ciphertext using the ciphertext, the public key, and some operation keys received from the client 100. If necessary, the server 200 may generate another operation key using some operation keys received from the client 100. In various embodiments, the server 200 may generate a rotation operation key using the public key and the hierarchical Galois key in response to a rotation shift request for the ciphertext by receiving the hierarchical Galois key. The server 200 may generate the rotation operation key by performing a rotation operation on the public key using the hierarchical Galois key.

In various embodiments, the client 100 may be various electronic devices of a user. For example, the client 100 may be a user PC, a mobile device, an IoT device, a car, a home appliance, a sensor, etc. In various embodiments, the server 200 may be various types of servers that perform operations according to homomorphic encryption. For example, the server 200 may be a search server, AI as a service (AIaaS), Secure AIaaS, a cloud server, etc.

The client 100 may request a service using a homomorphic encryption operation from the server 200 with respect to personal information data. The personal information data may be collected, generated, or modified by the client 100. In various embodiments, the personal information data may be data for which personal information protection is requested by the user, or may be managed as personal information data according to a data type. For example, the personal information data may be user biometric data, a photo, a moving image, log data, etc. In various embodiments, the service may be provided through data processing such as a neural network, genome analysis, AI as a service, and search. In addition, in various embodiments, the server 200 may perform a homomorphic encryption operation to provide the various services.

In homomorphic encryption, an operation requires an operation key, and in the conventional client 1-server 2 model that performs the homomorphic encryption operation, the client 1 encrypting data needs to generate an operation key using a secret key. For example, when the client 1 encrypts data, generates a multiplication key, which is a type of public key, using the secret key, and transmits the multiplication key together with a ciphertext to the server 2, the server 2 may perform a homomorphic encryption operation on the ciphertext using the multiplication key. However, when the client 1 generates all the operation keys necessary for homomorphic encryption and transmits the operation keys to the server 2, problems of computational burden and communication cost arise. In various embodiments of the present disclosure, the client 100 may transmit an operation key (public key) for generating other operation keys to the server 200 so that the client 100 generates only some of all operation keys necessary for homomorphic encryption, and remaining operation keys are generated in the server 200.

In the client 100-server 200 model 10 according to the embodiment, there are BFV (Brakerski JFan-Vercauteran) and CKKS (Cheon-Kim-Kim-Song) as a fully homomorphic encryption method for performing various arithmetic operations on a ciphertext according to homomorphic encryption. The two methods may each perform an operation for each element on an encrypted message vector. For example, in the case of a multiplication operation, a value obtained by multiplication for each element becomes a total message vector value. For advanced operations such as bootstrapping, matrix multiplication, and convolution of convolutional neural networks, shifts of elements of the encrypted message vector need to be performed in advance, and BFV and CKKS support rotation operations for this purpose. A rotation operation key is required for a rotation operation on homomorphic ciphertext. Referring to FIG. 1, a conventional client 1 generates a rotation operation key using a secret key and transmits the rotation operation key to the server 2, thereby performing a rotation operation on a ciphertext in the server 2. However, in an advanced operation that requires rotation shifts for many cyclic shifts, such as a deep convolutional neural network, only the size of the entire rotation operation key required may be hundreds of gigabytes. For example, when a standard ResNet-20 network for a CIFAR-10 data set and a ResNet-18 network for an ImageNet data set are implemented with pretrained parameters of a CKKS scheme having polynomial modulus of $N=2^{16}$ and $N=2^{17}$, respectively, the server requires 265 rotation operation keys and 617 rotation operation keys, which occupy 105 GB and 197.6 GB of memory, respectively. Such cost burden may cause a problem to the extent that it is virtually impossible to perform a homomorphic operation in the conventional client 1-server 2 model that generates a rotation operation key using a secret key.

In the client 100-server 200 model in which the right to generate some operation keys is delegated to the server 200 according to various embodiments of the present disclosure, when the client 100 generates only the hierarchical Galois key and transmits the hierarchical Galois key to the server 200, the server 200 may directly generate a plurality of rotation operation keys using the hierarchical Galois key when a rotation operation is required. The client 100 may generate the hierarchical Galois key, which is a type of public key, using a secret key, and the server 200 may directly generate and use a necessary rotation operation key using the public key and the hierarchical Galois key received from the client 100.

Figure 3:
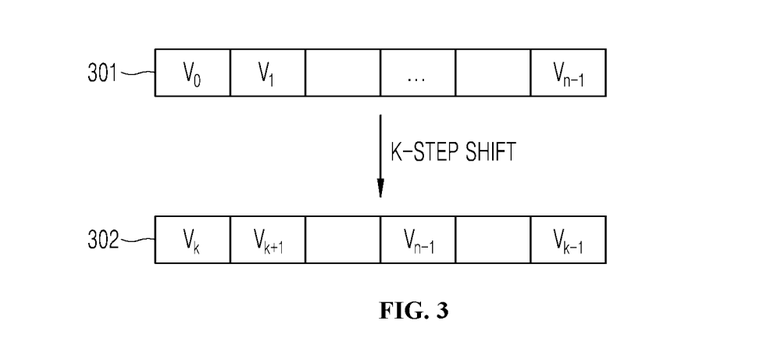
FIG. 3 illustrates a k-step rotation operation for each element of encrypted data according to an embodiment.

FIG. 3 illustrates a k-step rotation operation for each element of encrypted data according to an embodiment.

Among homomorphic encryption operations, an operation that requires an operation key to be generated using a secret key in an electronic device generating a ciphertext include a multiplication operation, a conjugate complex operation, and a rotation operation. For one ciphertext, a multiplication operation key and a conjugate complex operation key are single keys, whereas the rotation operation requires a plurality of operation keys according to a degree of rotation.

In a fully homomorphic encryption scheme, a rotation operation performed in advance to perform an operation for each element on an encrypted message vector may be described as cyclic shifts of the message vector. Referring to FIG. 3, encrypted data 301 and 302 may be expressed by a plurality of message vectors $v_0, v_1, \ldots, v_{n-1}$. A result of performing a rotation operation corresponding to a k-step shift on the message vector of the encrypted data 301 is the same as that of the data 302. When the rotation operation is performed on the encrypted data, a location of each vector corresponding to an element may be shifted by k. For description, k may be defined as an arbitrary number, and a value of k may be determined by an advanced operation requiring the rotation operation. In other words, the value of k may be determined in response to a degree of cyclic shifts.

The rotation operation key requires a different rotation operation key for each rotation shift, which means that a large number of rotation operation keys corresponding to various values of k are required. The rotation operation key may be generated using a secret key by a client that generates a homomorphic ciphertext in the same way as other operation keys. In various embodiments of the present disclosure, the rotation operation key may be generated without the secret key of the client 100 using only the public keys generated by the client 100. In various embodiments, the server 200 not knowing the secret key of the client 100 may generate a rotation operation key for the k-step shift using a hierarchical Galois key corresponding to the k-step shift, which is a type of public key.

Figure 4:
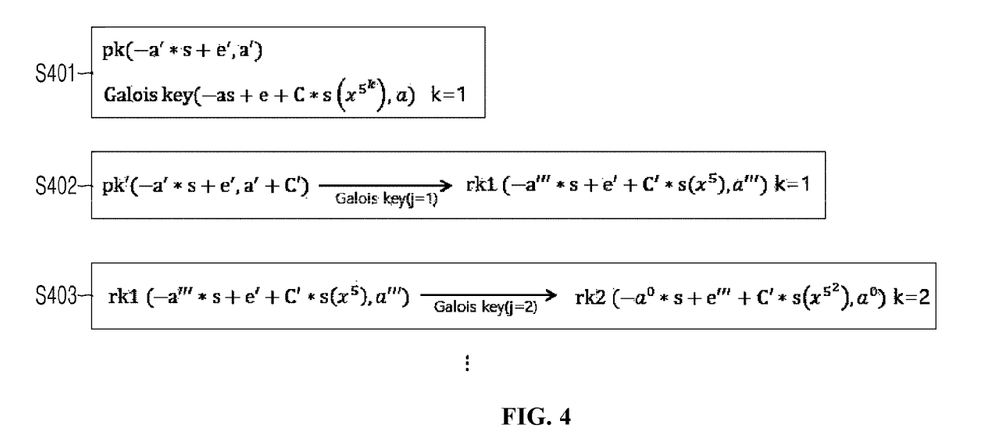
FIG. 4 is an example of a method of generating a homomorphic rotation operation key in a server delegated a right to generate an operation key according to an embodiment.

FIG. 4 is an example of a method of generating a homomorphic rotation operation key in the server 200 delegated a right to generate an operation key according to an embodiment.

In an embodiment, a homomorphic encryption operation key management system 100 may generate a plurality of homomorphic rotation operation keys using one or more public keys received from the client 20. The one or more public keys may include a public key generated using a secret key of the client 200 and one or more hierarchical Galois keys. A public key for a homomorphic encryption operation may be expressed as a polynomial.

In step S401, the homomorphic encryption operation key management system 100 may receive one or more public keys (for example, a public key pk and a hierarchical Galois key) from the client 200.

The public key pk may be defined as a secret key s, a polynomial "a" uniformly and randomly extracted from a set of a finite number of polynomials, a small error e, and a large constant C.

The hierarchical Galois key is a type of public key, and may be defined as a secret key s, a polynomial "a" uniformly and randomly extracted from a set of a finite number of polynomials, a small error e, and a large constant C in response to a k-step shift.

In step S402, the homomorphic encryption operation key management system 100 may partially transform the public key pk to generate pk', and perform a rotation operation on the transformed public key pk' using the hierarchical Galois key, thereby generating a rotation operation key rk1 corresponding to k=1.

In step S403, the homomorphic encryption operation key management system 100 may perform a rotation operation on the rotation operation key rk1 generated in step S402 using the hierarchical Galois key, thereby generating a rotation operation key rk2 corresponding to k=2.

The homomorphic encryption operation key management system 100 may generate a plurality of rotation operation keys by repeatedly performing a rotation operation using a hierarchical Galois key, and when the hierarchical Galois key corresponds to a k-step shift, the plurality of generated rotation operation keys may correspond to multiples of the k-step shift.

Figure 5:
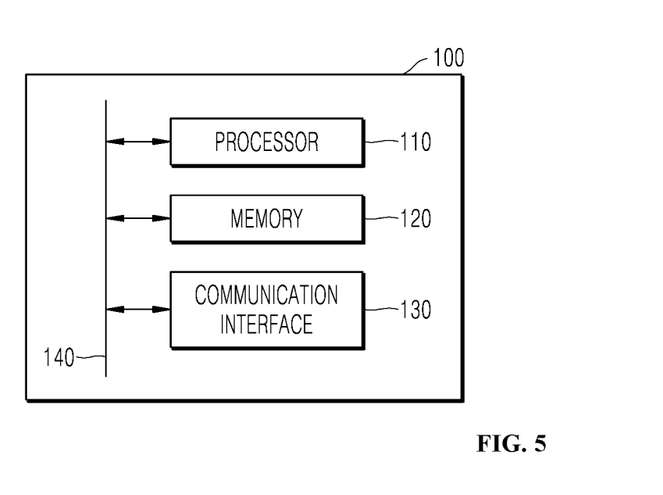
FIG. 5 is a block diagram including components of a client according to an embodiment.

FIG. 5 is a block diagram including components of the client 100 according to an embodiment.

The client 100 according to the embodiment is an electronic device 100, and may include a processor 110, a memory 120, a communication interface 130, and a bus 140.

The processor 110 is a type of central processing unit, and may execute one or more instructions stored in the memory 120 to control an operation of the electronic device 100. The processor 110 may include any type of device capable of processing data. For example, the processor 110 may refer to a data processing device embedded in hardware having a physically structured circuit to perform a function expressed as code or an instruction included in a program. As an example of the data processing device embedded in the hardware as described above, it is possible to include a processing device such as a microprocessor, a central processing unit (CPU), a processor core, a multiprocessor, an application-specific integrated circuit (ASIC), or a field programmable gate array (FPGA). However, the present invention is not limited thereto. The processor 110 may include one or more processors. The processor 110 may include at least one core.

The processor 110 may generate a ciphertext obtained by encrypting personal information data stored in the memory 120 according to homomorphic encryption. The processor 110 may generate a public key and one or more operation keys using a secret key of the electronic device 100. The one or more operation keys may correspond to some operation keys among all operation keys for the homomorphic encryption operation, and may include an operation key for generating other operation keys. In an embodiment, the one or more operation keys may include a multiplication key, a conjugate complex key, and a hierarchical Galois key for a homomorphic encryption rotation operation, and the hierarchical Galois key may generate a plurality of rotation operation keys for the homomorphic encryption rotation operation.

In an embodiment, the processor 110 may generate the hierarchical Galois key as follows.

The processor 110 may define different sets of prime numbers $C=\{q_0, \ldots, q_L\}$ and $B=\{p_0, \ldots, p_{K-1}\}$. All these sets may be used as variables (basis) of a residue number system (RNS). The processor 110 may define another set of prime numbers $M=\{t_0, \ldots, t_{k-1}\}$ as master special prime numbers. When $$Q = \prod_i q_i, \; P = \prod_i p_i, \; T = \prod_i t_i$$

for convenience of description, names may be re-named in order as $C \cup B = \{\overline{q_0}, \ldots, \overline{q_{L+K}}\}$.

A decomposition number dnum is $=(L+1)/\text{dnum}$, and the processor 110 may define a value obtained by collecting and multiplying prime numbers as $$\{Q_j\}_{0 \leq j < dnum} = \left\{ \prod_{i=j\alpha}^{(j=1)\alpha-1} q_i \right\}.$$

The processor 110 may define $$\hat{Q} - i = \prod_{j \neq i} Q_i$$

and allow $|P| \geq \max(Q_j)$ to be satisfied.

A master decomposition number mdnum is $\alpha_m = (L+1)/\text{mdnum}$, and a value obtained by collecting and multiplying prime numbers may be defined as $$\{\overline{Q_j}\}_{0 \leq j < mdnum} = \left\{ \prod_{i=j\alpha_m}^{(j+1)\alpha_m-1} \overline{q_i} \right\}.$$

The processor 110 may define $$\hat{\overline{Q}}_i = \prod_{j \neq i} \overline{Q_i},$$

and allow $|T| \geq \max(\overline{Q_j})$ to be satisfied.

The processor 110 may define a rotation key corresponding to k for a secret key polynomial s as $\text{mswk}_k = \{\text{mswk}_{k,i}\}_{i=0, \ldots, mdnum-1}$, where $\text{mswk}_{k,i} = (\overline{b_{k,i}}, \overline{a_{k,i}}) \in R_{PQT}^2$, $\overline{a_{k,i}}$ is extracted from a uniform distribution in $R_{PQT}$, and $$\overline{b_{k,i}} = -\overline{a_{k,i}}s + \overline{e_{k,i}} + T \cdot \hat{\overline{Q}}_i \cdot [\hat{\overline{Q}}_i^{-1}]_{\overline{Q}_i} \cdot s(X^{5^k}).$$

The processor 110 may generate each of hierarchical Galois keys for $k=1, -1, 2, -2, 4, -4, \ldots, -2^{n-2}, 2^{n-2}, 2^{n-1}$. The value k is an example, and may be determined as a value such that values from $-2^{n-1}$ to $2^{n-1}$ are obtained by a sum of combinations allowing repetition. The hierarchical Galois key has the form of $(b_e, a_e) \in R_{PQ}^2$, and may be defined so that $\alpha_e$ is an element uniformly extracted from $R_{PQ}$, and $b_e = -a_e s + e_e$.

The processor 110 may generate a plurality of rotation operation keys by repeatedly performing a rotation operation on the public key using the hierarchical Galois key. The hierarchical Galois key may be generated in response to a k-step shift, and may be generated by the processor 110 at the request of the server 200. The processor 110 may generate a plurality of rotation operation keys corresponding to multiples of the k-step shift by using the hierarchical Galois key corresponding to the k-step shift. The processor 110 may generate one or more hierarchical Galois keys corresponding to different step shifts. The one or more hierarchical Galois keys may generate a plurality of rotation operation keys corresponding to different step shifts, respectively. In various embodiments, when a hierarchical Galois key set includes Galois keys corresponding to $k=\{1, -1, 2, -2, 4, -4, 8, -8\}$, the processor 110 may generate a rotation operation key by combining k different Galois keys. For example, the processor 110 may sequentially use a Galois key corresponding to $k=8$ and a Galois key corresponding to $k=2$ to generate a rotation operation key for a 10-step shift.

The memory 120 may include an internal memory and/or an external memory, and may include a volatile memory such as a DRAM, an SRAM, or an SDRAM, a nonvolatile memory such as a one time programmable ROM (OTPROM), a PROM, an EPROM, an EEPROM, a mask ROM, a flash ROM, a NAND Flash memory, or a NOR flash memory, a flash drive such as an SSD, a compact flash (CF) card, an SD card, a Micro-SD card, a Mini-SD card, an Xd card, or a memory stick, or a storage device such as an HDD. The memory 120 may include magnetic storage media or flash storage media. However, the present invention is not limited thereto.

In an embodiment, the memory 120 may store personal information data, a secret key, a public key, and a hierarchical Galois key of the electronic device 100. The personal information data may include user biometric data, a photo, a moving image, or log data collected by the electronic device 100.

The communication interface 130 may include one or more communication interfaces for providing wired or wireless communication. In various embodiments, the communication interface 130 may transmit and receive a key and a token through a secure channel or an authentication channel using a secure protocol. For example, the communication interface 130 may use Transport Layer Security (TLS) or Internet Protocol Security (IPSec). The communication interface 130 may prevent a denial-of-service attack or a replay attack by an external attacker due to key exposure or key contamination during communication with the server 200.

The bus 140 is a logical/physical path connecting the processor 110, the memory 120, and the communication interface 130. For example, the processor 110 may perform reading and writing with respect to the memory 120 through the bus 130.

Figure 6:
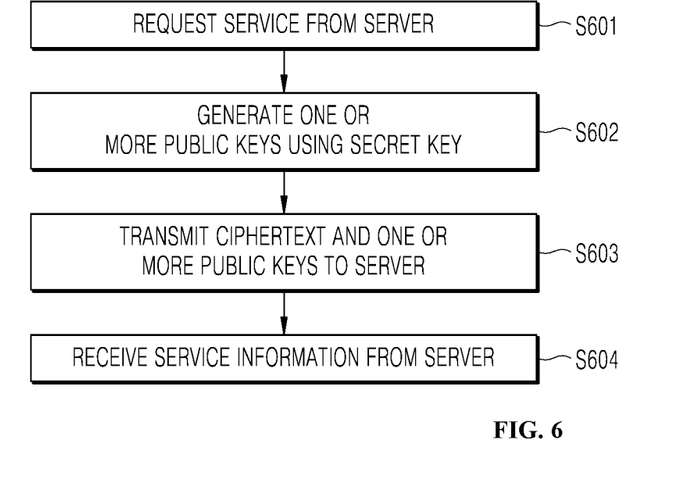
FIG. 6 is a flowchart of a method in which the client requests a service including a homomorphic encryption operation from the server according to an embodiment.

FIG. 6 is a flowchart of a method in which the client 100 requests a service including a homomorphic encryption operation from the server 200 according to an embodiment.

In step S601, the electronic device (for example, the client 100) according to an embodiment may request a service using a homomorphic encryption operation from the server 200. The service may include operation processing for a ciphertext according to homomorphic encryption, and for example, a result of processing a homomorphic ciphertext using a neural network may be provided as service information. The electronic device 100 may request a service using the homomorphic encryption operation from the server 200 for the ciphertext generated by encrypting the personal information data stored in the memory 120 according to homomorphic encryption.

In step S602, the client 100 may generate one or more public keys using a secret key. The one or more public keys may include an operation key. For example, the one or more public keys may include a multiplication key and a conjugate complex key. The one or more public keys may correspond to some operation keys among all operation keys required for the homomorphic encryption operation. The one or more public keys may include an operation key (for example, a hierarchical Galois key) capable of generating another operation key (for example, a rotation operation key). In an embodiment, the client 100 may generate a hierarchical Galois key (public key) capable of generating a rotation operation key for performing a rotation operation of homomorphic encryption. The client 100 may generate a hierarchical Galois key for a k-step shift, and when the hierarchical Galois key for the k-step shift is used, it is possible to use a plurality of rotation operation keys corresponding to multiples of the k-step shift without a secret key. The hierarchical Galois key may include one or more Galois keys, and may be a set including Galois keys corresponding to a plurality of values of k.

In step S603, the client 100 may transmit a ciphertext according to homomorphic encryption and one or more public keys to the server 200. The one or more public keys may include an operation key and an operation key capable of generating other operation keys. For example, the one or more public keys may include a multiplication key, a conjugate complex key, and a hierarchical Galois key.

In step S604, the client 100 may receive service information including a result of processing the homomorphic encryption operation on the ciphertext from the server 200. The server 200 may process a service request for the ciphertext, and may perform a homomorphic encryption operation at this time. The server 200 may directly generate and use a necessary operation key using a public key received from the client 100 as necessary during the homomorphic operation on the ciphertext. For example, the server 200 may transmit a result of operation processing on the ciphertext using a neural network as service information to the client 100.

Figure 7:
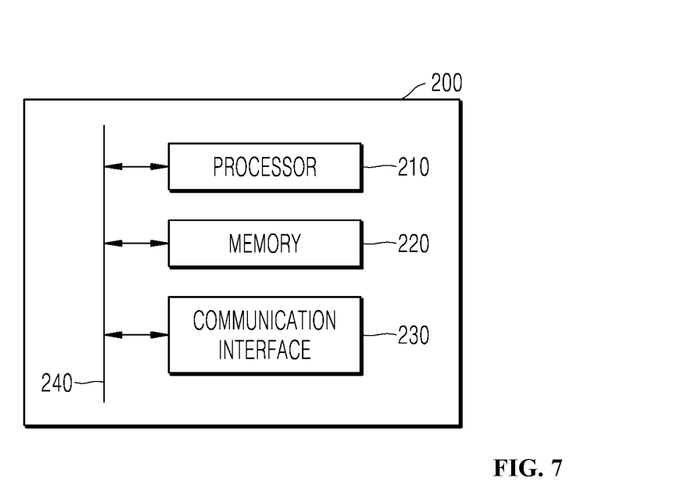
FIG. 7 is a block diagram including components of a server according to an embodiment.

FIG. 7 is a block diagram including components of the server 200 according to an embodiment.

The server 200 according to an embodiment may include a processor 210, a memory 220, a communication interface 230, and a bus 240.

The processor 210 is a type of central processing unit, and may execute one or more instructions stored in the memory 220 to control an operation of the server 200. The processor 210 may include any type of device capable of processing data. For example, the processor 110 may refer to a data processing device embedded in hardware having a physically structured circuit to perform a function expressed as code or an instruction included in a program. As an example of the data processing device embedded in the hardware as described above, it is possible to include a processing device such as a microprocessor, a CPU, a processor core, a multiprocessor, an ASIC, or an FPGA. However, the present invention is not limited thereto. The processor 210 may include one or more processors. The processor 210 may include at least one core.

The processor 210 may generate a rotation operation key using the public key and the hierarchical Galois key of the client 100 in response to a data shift request for a homomorphic encryption operation on a ciphertext received from the client 100, and perform a rotation operation on the ciphertext using the rotation operation key. The processor 210 may generate a rotation operation key without a secret key of the client 100 by performing a rotation operation using the hierarchical Galois key on the public key of the client 100. The hierarchical Galois key may be generated in response to a k-step shift, and the processor 210 may generate a plurality of rotation operation keys corresponding to multiples of the k-step shift by repeatedly performing a rotation operation using the hierarchical Galois key corresponding to the k-step shift. Before receiving the hierarchical Galois key from the client 100, the processor 210 may first request a hierarchical Galois key corresponding to a step shift required for the homomorphic encryption operation. That is, the server 200 may request a hierarchical Galois key set from the client 100 by specifying a set of values of k.

In an embodiment, the processor 210 may generate one or more rotation operation keys using the hierarchical Galois key as follows.

When a rotation key of l can be generated, the processor 210 may define $l = l_0 + l_1 + \ldots + l_{u-1}$, where each $l_i$ is a value for which a hierarchical Galois key exists. The processor 210 may first generate a rotation operation key of $l_0$ using a hierarchical Galois key of $l_0$ in an encryption key (public key). The processor 210 performs a rotation operation by $mswkl_0$ on $(b_e, a_e + P \cdot \hat{Q}_r [\hat{Q}^{-1}]_{Q_r}$ to generate $swki_{l_0,r}$ and performs this operation on $r=0, \ldots, dnum-1$ using such a method. As a result, $swk_{l_0} = \{swk_{l_0,r}\}_{r=0,\ldots,dnum-1}$ is generated, and the rotation operation key of $l_0$ is generated. In addition, the processor 210 may generate $swk_{k^{(j)}} = \{swk_{k^{(j-1)}},r\}_{r=0,\ldots,dnum-1}$, which is a rotation operation key for $k^{(j)} = l_0 + l_1 + \ldots + l_j$, from $swk_{k^{(j-1)}} = \{swk_{k^{(j-1)}},r\}_{r=0,\ldots,dnum-1}$ which is a rotation operation key for $k^{(j-1)} = l_0 + l_1 + \ldots + l_{j-1}$.

The processor 210 may generate $swk_{k^{(j)},r}$ by applying a rotation operation by using $mswkl_j$ to a ciphertext $swk_{k^{(j-1)},r}$, and may perform this operation for all of $r=0, \ldots, dnum-1$. As a result, $swk_{k^{(j)}} = \{swk_{k^{(j)},r}\}_{r=0,\ldots,dnum-1}$ may be generated and become a rotation operation key of $k^{(j)}$. The processor 210 may perform the above process for all of $l_0, l_1, \ldots, l_{u-1}$ to generate a rotation operation key for l.

The processor 210 may provide a neural network service, AI as a service, or a search service. The processor 210 may process a homomorphic encryption operation as a means for processing the service.

The memory 220 may include an internal memory and/or an external memory, and may include a volatile memory such as a DRAM, an SRAM, or an SDRAM, a nonvolatile memory such as an OTPROM, a PROM, an EPROM, an EEPROM, a mask ROM, a flash ROM, a NAND Flash memory, or a NOR flash memory, a flash drive such as an SSD, a CF card, an SD card, a Micro-SD card, a Mini-SD card, an Xd card, or a memory stick, or a storage device such as an HDD. The memory 220 may include magnetic storage media or flash storage media. However, the present invention is not limited thereto.

In an embodiment, the memory 220 may include a ciphertext of the client 100, one or more public keys, and a directly generated operation key. For example, the memory 220 may include a ciphertext of the client 100, a public key for the ciphertext, a multiplication key, a conjugate complex key, a hierarchical Galois key set, and a plurality of rotation operation keys generated from the hierarchical Galois key set.

The communication interface 230 may include one or more communication interfaces for providing wired or wireless communication. In various embodiments, the communication interface 130 may transmit and receive a key and a token through a secure channel or an authentication channel using a secure protocol. For example, the communication interface 230 may use TLS or IPSec. The communication interface 230 may prevent a denial-of-service attack or a replay attack by an external attacker due to key exposure or key contamination during communication with the client 100.

The bus 240 is a logical/physical path connecting the processor 210, the memory 220, and the communication interface 230. For example, the processor 210 may perform reading and writing with respect to the memory 220 through the bus 230.

Figure 8:
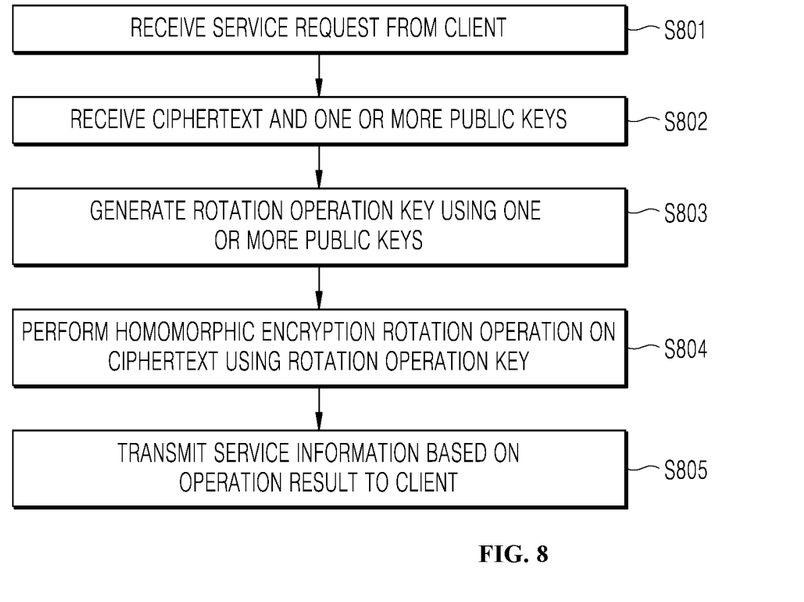
FIG. 8 is a flowchart of a method of performing a homomorphic encryption operation by generating some operation keys in the server according to an embodiment.

FIG. 8 is a flowchart of a method of performing a homomorphic encryption operation by generating some operation keys in the server 200 according to an embodiment.

In step S801, the server 200 may receive a service request from the client 100. The service may include a process of processing a homomorphic encryption operation for a homomorphic ciphertext generated by the client 100. For example, the service may be an operation using a neural network.

In step S802, the server 200 may receive, from the client 100, an encrypted ciphertext according to homomorphic encryption, and one or more public keys. The one or more public keys may include an operation key (for example, a multiplication key or a conjugate complex key) and an operation key (hierarchical Galois key) capable of generating other operation keys (for example, rotation operation), and may include, for example, a hierarchical Galois key. The hierarchical Galois key generates a plurality of rotation operation keys necessary for a homomorphic encryption rotation operation.

In step S803, the server 200 may generate a rotation operation key using one or more public keys in response to a homomorphic rotation operation request for the ciphertext. The server 200 may generate the rotation operation key by performing a rotation operation on the public key using the hierarchical Galois key. For example, when the hierarchical Galois key corresponds to a k-step shift, if the server 200 performs the rotation operation on the public key using the hierarchical Galois key, a rotation operation key for the k-step shift is generated. The server 200 may generate the rotation operation key for a step shift corresponding to a multiple of k by repeatedly performing the rotation operation on the public key using the hierarchical Galois key. The server 200 may generate a necessary rotation operation key according to progress of a rotation operation request. The rotation operation request may be generated in various cases where a shift of each element is required to perform another operation on the ciphertext.

In step S804, the server 200 may perform a rotation operation on the ciphertext using the rotation operation key. For example, in the case of a rotation operation key for a k-step shift, it is possible to perform a rotation operation of the k-step shift on the ciphertext.

In step S805, the server 200 may transmit service information based on an operation result for the ciphertext including the rotation operation of step S804 to the client 100. The service information may be, for example, a search result.

Figure 9:
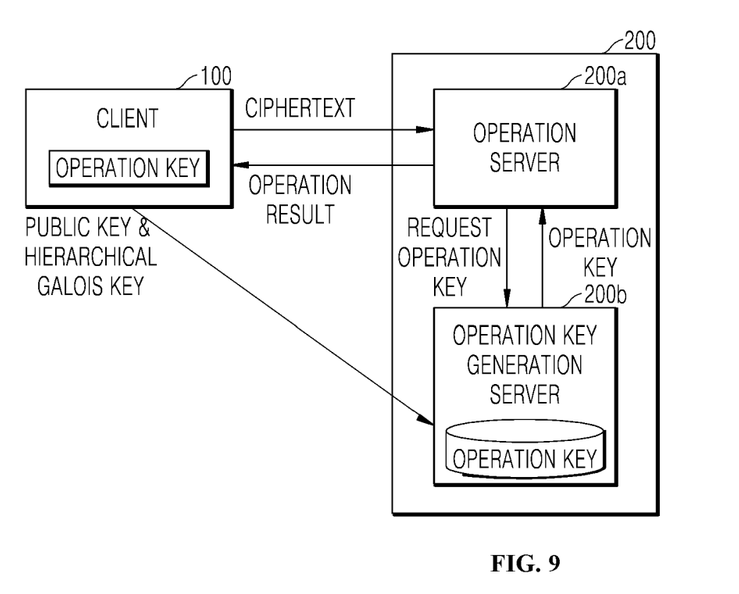
FIG. 9 is a network environment of a client-server model including an operation server and an operation key generation server according to an embodiment.

FIG. 9 is a network environment of a client 100-server 200 model including an operation server 200*a* and an operation key generation server 200*b* according to an embodiment.

The client 100 according to an embodiment may transmit a public key and a hierarchical Galois key for generating a rotation operation key and a homomorphic ciphertext to the server 200. The server 200 may include the operation server 200*a* that processes a service operation, and the operation key generation server 200*b* that generates an operation key for performing a homomorphic encryption operation. The client 100 may transmit only the ciphertext to the operation server 200*a*, and may transmit the public key and the hierarchical Galois key to the operation key generation server 200*b*.

When there is a request for a rotation operation on the ciphertext, the operation server 200*a* may request a rotation operation key corresponding to a necessary step shift from the operation key generation server 200*b*. The operation key generation server 200*b* may generate a rotation operation key using the public key and the hierarchical Galois key transmitted by the client 100 and transmit the generated rotation operation key to the operation server 200*a* in response to an operation key request for the client 100. Even though only one client 100 is illustrated in FIG. 9, there may be a plurality of clients 100 requesting services from the server 200, and various types of services may be provided by the server 200.

The embodiments described above may be implemented by a hardware component, a software component, and/or a combination of the hardware component and the software component. For example, the devices, methods, and components described in the embodiments may be implemented using one or more general-purpose or special-purpose computers such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications running on the operating system. In addition, the processing device may access, store, manipulate, process, and generate data in response to execution of software. For convenience of understanding, even though one processing device is described as being used in some cases, one of ordinary skill in the art will recognize that the processing device may include a plurality of processing elements and/or a plurality of types of processing elements. For example, the processing device may include a plurality of processors or one processor and one controller. In addition, it is possible to adopt another processing configuration such as a parallel processor.

Software may include a computer program, code, an instruction, or a combination of one or more thereof, and may configure a processing device to operate as desired or independently or collectively instruct the processing device. The software and/or data may be permanently or temporarily embodied in a type of machine, component, physical device, virtual equipment, computer storage medium or device, or transmitted signal wave in order to be interpreted by the processing device or to provide an instruction or data to the processing device. The software may be distributed over a networked computer system and stored or executed in a distributed manner. The software and data may be stored in one or more computer-readable recording media.

The method according to the embodiment may be implemented in the form of a program instruction that can be executed through various computer means and recorded in a computer-readable medium. The computer-readable medium may include a program instruction, a data file, a data structure, etc. alone or in combination. The program instruction recorded in the medium may be specially designed and configured for the embodiment, or may be known and used by those skilled in the art of computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and execute program instructions, such as a ROM, a RAM, a flash memory, etc. Examples of the program instruction include not only machine language code such as that generated by a compiler, but also high-level language code that can be executed by a computer using an interpreter, etc. The hardware devices described above may be configured to operate as one or more software modules to perform operations of the embodiments, and vice versa.

According to the embodiments of the present disclosure, the client device does not need to directly generate a plurality of homomorphic rotation keys and transmit the homomorphic rotation keys to the server performing the homomorphic operation, and may generate only the hierarchical Galois key and delegate the right to generate the plurality of homomorphic rotation keys to the server, thereby appropriately distributing the amount of computation between the client device and the server, and significantly reducing the communication cost.

According to the embodiments of the present disclosure, since the server may directly generate the homomorphic rotation key necessary for the homomorphic encryption operation at a necessary time, it is possible to perform management so that homomorphic rotation keys corresponding to various step shifts are deleted or stored in a memory.

As described above, even though the embodiments have been described with reference to the limited embodiments and drawings, various modifications and variations are possible by those skilled in the art from the above description. For example, an appropriate result may be achieved even when the described techniques are performed in an order different from that of the described method, and/or the described components of the system, structure, device, circuit, etc. are combined or associated in a form different from that in the described method, or replaced or substituted by other components or equivalents. Therefore, other implementations, other embodiments, and equivalents to the claims are also within the scope of the following claims.

What is claimed is:

1. An electronic device comprising:
a communication interface configured to support communication using a security protocol;
a memory including personal information data; and
at least one processor operatively coupled to the communication interface and the memory, wherein:
the at least one processor:
generates a ciphertext obtained by encrypting the personal information data according to homomorphic encryption and generates a public key and one or more operation keys by using a secret key for the electronic device;
transmits the ciphertext, the public key, and the one or more operation keys to a server through the communication interface; and
receives service information acquired based on a homomorphic encryption operation on the ciphertext from the server, and
the one or more operation keys correspond to some of all operation keys necessary for the homomorphic encryption operation, wherein the one or more operation keys include a multiplication key, a conjugate complex key, and one or more hierarchical Galois keys.

2. The electronic device according to claim 1, wherein the one or more operation keys include a hierarchical Galois key for a homomorphic encryption rotation operation, and the hierarchical Galois key generates a plurality of rotation operation keys for the homomorphic encryption rotation operation.

3. The electronic device according to claim 2, wherein the plurality of rotation operation keys is generated by repeatedly performing a rotation operation on the public key using the hierarchical Galois key.

4. The electronic device according to claim 3, wherein the at least one processor generates the hierarchical Galois key in response to a k-step shift, and the plurality of rotation operation keys is generated in response to a multiple of the k-step shift.

5. The electronic device according to claim 4, wherein a master key corresponding to the k-step shift is generated in response to receiving a request for the k-step shift for a homomorphic encryption operation from the server.

6. The electronic device according to claim 1, wherein the at least one processor generates the one or more hierarchical Galois keys in response to different step shifts.

7. The electronic device according to claim 1, wherein the personal information data includes at least one of user biometric data, a photo, a moving image, and log data collected by the electronic device.

8. The electronic device according to claim 1, wherein the server acquires the service information according to a result of performing a homomorphic encryption operation on the ciphertext to provide a neural network service, AI as a service, or a search service.

9. A server comprising:
a communication interface configured to support communication using a security protocol; and
at least one processor operatively coupled to the communication interface, wherein:
the communication interface receives a ciphertext, a public key, and a hierarchical Galois key from an electronic device;
the at least one processor generates a rotation operation key using the public key and the hierarchical Galois key in response to a data shift request for a homomorphic encryption operation on the ciphertext; and the at least one processor performs a rotation operation on the ciphertext using the rotation operation key, wherein the at least one processor generates the rotation operation key by performing a rotation operation on the public key using the hierarchical Galois key, and wherein the at least one processor requests a hierarchical Galois key for generating a rotation operation key corresponding to a k-step shift from the electronic device before receiving the hierarchical Galois key.

10. The server according to claim 9, wherein the at least one processor generates a rotation operation key corresponding to a k-step shift using the hierarchical Galois key.

11. The server according to claim 10, wherein the at least one processor generates a plurality of rotation operation keys corresponding to multiples of the k-step shift by repeatedly performing a rotation operation on the public key using the hierarchical Galois key.

12. The server according to claim 9, wherein the at least one processor acquires service information according to a result of performing a homomorphic encryption operation on the ciphertext, and transmits the service information to the electronic device to provide a neural network service, AI as a service, or a search service.

13. The server according to claim 9, further comprising a memory, wherein:

the rotation operation key is stored in the memory; and the at least one processor performs a rotation operation using the rotation operation key stored in the memory in response to a re-request for a k-step shift for the ciphertext.

14. The server according to claim 13, wherein the at least one processor deletes the rotation operation key stored in the memory.

15. A non-transitory computer-readable storage medium storing one or more programs configured to be executed by a server system, the one or more programs including an instruction causing the server system to:

receive, at a communication interface, the communication interface configured to support communication using a security protocol, a ciphertext, a public key, and a hierarchical Galois key from an electronic device;

generate, by a processor, a rotation operation key using the public key and the hierarchical Galois key in response to a data shift request for a homomorphic encryption operation on the ciphertext; and perform, by the processor, a rotation operation on the ciphertext using the rotation operation key, wherein the processor generates the rotation operation key by performing a rotation operation on the public key using the hierarchical Galois key, and wherein the processor requests a hierarchical Galois key for generating a rotation operation key corresponding to a k-step shift from the electronic device before receiving the hierarchical Galois key.

16. The non-transitory computer-readable storage medium according to claim 15, wherein a plurality of rotation operation keys is generated by repeatedly performing, by the processor, a rotation operation on the public key using the hierarchical Galois key.

\* \* \* \* \*